No. 891,425. PATENTED JUNE 23, 1908.
S. H. KANMACHER.
LIMIT SWITCH DEVICE.
APPLICATION FILED DEC. 18, 1905.
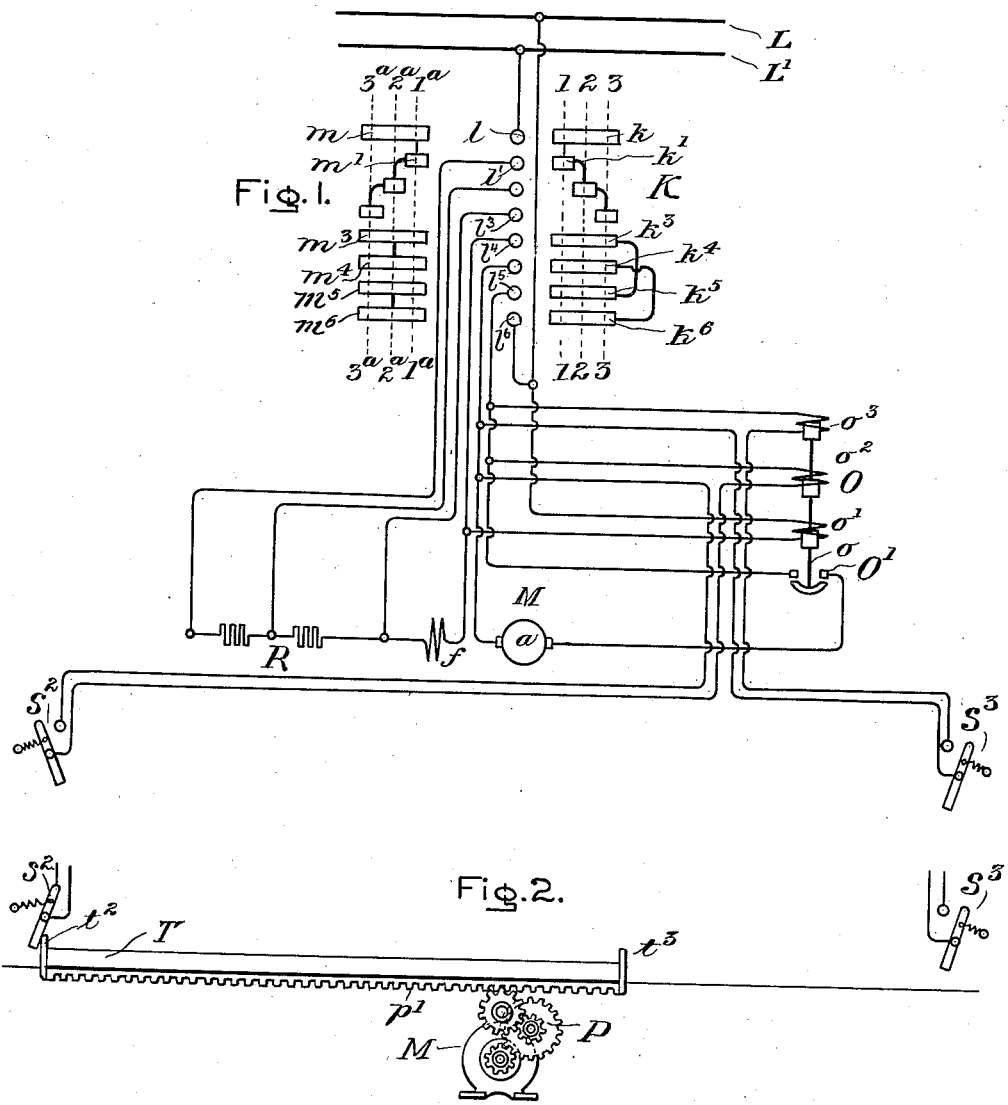
Witnesses:
Inventor:
Sam H. Kanmacher,
by Albert G. Davis,
Atty.

UNITED STATES PATENT OFFICE.

SAM H. KANMACHER, OF SCHENECTADY, NEW YORK, ASSIGNOR TO GENERAL ELECTRIC COMPANY, A CORPORATION OF NEW YORK.

LIMIT-SWITCH DEVICE.

No. 891,425.  Specification of Letters Patent.  Patented June 23, 1908.

Application filed December 18, 1905. Serial No. 292,181.

*To all whom it may concern:*

Be it known that I, SAM H. KANMACHER, a citizen of the United States, residing at Schenectady, county of Schenectady, and State of New York, have invented certain new and useful Improvements in Limit-Switch Devices, of which the following is a specification.

The present invention relates to control apparatus for electric motors and more particularly to means for bringing a motor to rest after it has made a predetermined number of revolutions in one direction or in either direction; and the present invention has for its object a novel construction and arrangement of parts to be hereinafter described and particularly pointed out in the claims.

In the accompanying drawing, Figure 1 indicates diagrammatically a preferred form of the present invention; and Fig. 2 a detail showing the manner of operating the limit switches at the extreme limits of movement of a member which is adapted to be reciprocated by a motor.

Similar reference characters throughout the specification and drawing indicate corresponding parts.

Reference being had to the drawing, M represents an electric motor illustrated as comprising an armature $a$ and a series field $f$.

K is a controller adapted to connect the motor to a source of current supply indicated by lines L, L$^1$, for either direction of rotation, and to control the speed of the motor when starting.

O is a relay adapted to control the motor circuit either directly, as shown, or indirectly; the object of this relay being to cause the motor circuit to be interrupted and the motor brought to rest when the motor has made a prescribed number of revolutions or the member adapted to be moved by the motor has reached its extreme limit. The relay is illustrated as having three coils, $o^1$, $o^2$ and $o^3$: these coils being so proportioned that when two of them are energized so as to have like polarities they serve to lift the movable member $o$ of the relay; while if two of the coils are energized so as to have opposite polarities they neutralize each other either wholly or to such an extent that their cumulative effect is insufficient to either lift or maintain the movable element of the relay. The coil $o^1$ is connected through the controller to the line, so that when the controller is moved into either its forward or reverse running position this coil is energized by current flowing through it in a constant direction. The coils $o^2$ and $o^3$, respectively, are so connected that they are maintained at opposite polarities and their polarities are reversed when the controller is moved from either forward or reverse to the opposite position. The circuit containing coil $o^2$ is only completed when limit switch S$^2$ is closed, and the circuit for the coil $o^3$ is similarly completed through limit switch S$^3$.

Assuming that the controller has been moved to the left into the position wherein the movable contacts engage with the fixed contacts along line 1, 1 and that the relay has been actuated, a circuit may be traced from line L$^1$, through contacts $l$, $k$, $k^1$, $l^1$, through resistance R, field winding $f$, contacts $l^3$, $k^3$, $k^5$, $l^5$, through the contacts O$^1$ of the relay, through the motor armature, contacts $l^4$, $k^4$, $k^6$ and $l^6$ to line L. A branch circuit may be traced from the right hand terminal of the field winding, through the coil $o^1$ of the relay, directly back to line L, thus energizing coil $o^1$ sufficiently to maintain the relay in its closed position. Other branch circuits lead from the same terminal of the field winding, namely from the lead between contact $l^5$ and the contact O$^1$ of the relay, through the coils $o^2$ and $o^3$ of the relay and thence through switches S$^2$ and S$^3$, respectively, contacts $l^4$, $k^4$, $k^6$, $l^6$ back to line L. The coils $o^2$ and $o^3$ are wound in opposite directions so that if both of the limit switches S$^2$ and S$^3$ are closed the effect of these coils will be to neutralize each other; while if only switch S$^2$ is closed the coil $o^2$ will assist the coil $o^1$; and if switch S$^3$ alone is closed, the coil $o^3$ will oppose the coil $o^1$. Thus it will be seen that if, before the controller is moved to its operative position, the switch S$^2$ is closed and the switch S$^3$ is left open, both coils $o^1$ and $o^2$ will be energized when the controller is moved into the position assumed, thereby causing the relay to operate to complete the motor circuit. If now switch S$^2$ is opened, the relay will be maintained in its actuated position by the coil $o^1$. If the switch S$^3$ is closed, the coil $o^3$ will be energized, and, since its effect is to oppose the coil $o^1$, the core of the relay will drop and the motor circuit be opened. If, while the switch S$^3$ remains closed, the controller is moved into the reverse running position wherein the movable contacts engage with the fixed contacts along $1^a$, $1^a$, current will flow to line $L^1$, through contacts $l$, $m$, $m^1$ and $l^1$, through resistance R and field winding $f$, as before, and thence through the coil $o^1$ of the relay back to line L. A branch circuit extends from the right-hand coil of the field winding through contact $l^3$, $m^3$, $m^4$, $l^4$, through the switch $S^3$, through the coil $o^3$, through contacts $l^5$, $m^5$, $m^6$, $l^6$, to line L. It will be seen that current now flows through the coil $o$ in the opposite direction from that in which it previously flowed, namely, in a direction such that the coil $o^3$ assists the coil $o^1$ to operate the relay. If now switch $S^3$ is opened and switch $S^2$ closed, coil $o^3$ is de-energized and coil $o^2$ energized, but this latter coil instead of assisting the coil $o^1$ as before now opposes it, since the direction of current flow through it has been reversed, and therefore the core of the relay drops and the motor circuit is opened. It is seen that in this reverse position of the controller the current through the armature, which is connected in parallel with the coils $o^2$ and $o^3$, is reversed so that the direction of rotation of the motor is the reverse of that which takes place when the controller is in its forward running position.

I have made use of switches $S^2$ and $S^3$ for automatically stopping the motor after it has made a predetermined number of revolutions in one direction or the other. For example, the switches $S^2$ and $S^3$ may be spring-actuated so as to remain normally open and they may be alternately closed through engagement with projections $t^2$ and $t^3$ on a table or other member T which is adapted to be reciprocated between defined limits by means of the motor M. The motor is illustrated as geared to the table by means of gearing P and a rack $P^1$. In Fig. 2 the table is illustrated in one of its extreme positions, namely, that position wherein switch $S^2$ is closed. It is evident if now the controller is moved to the left the relay will be actuated and the motor started. The direction of rotation of the motor is such as to move the table toward the right, and, as the table begins its travel, the switch $S^2$ is released and opens; the relay, however, is maintained closed through the action of maintaining coil $o^1$, until the table reaches its other extreme position wherein it closes switch $S^3$. This causes the coil $o^3$ to be energized, but in such a manner that it opposes the action of coil $o^1$, and the relay drops and opens the motor circuit, bringing the motor and table to rest. When it is desired to move the table back to its original position, the controller is reversed and the relay is actuated in the manner previously described, through coils $o^1$ and $o^3$. The motor circuit is now complete and the motor operates until the table reaches the position shown and causes the coil $o^2$ to be energized so as to oppose the coil $o^1$, thereby letting the relay drop and open the circuit.

In the second and third running positions of the controller for either direction of rotation of the motor, half and then all of the resistance R is cut out so that the motor is finally connected directly across the line independently of the resistance. It is evident that this method of controlling the speed of the motor forms no part of the present invention and may be varied as may also the type of motor and the manner in which the relay controls the motor circuit. If the coils of the relay are so proportioned that one alone is insufficient to raise the core of the relay, while ample to maintain it raised, then if the current fails or the controller is turned off while the table or other member is in an intermediate position, it will be impossible to start it again unless the relay is closed manually or one of the limit switches is momentarily closed. On the other hand, if one of the coils alone is sufficient to lift the relay core then the motor circuit may be completed at any time upon operating the controller in the proper or desired direction. The condition of service will, of course, determine which of the two arrangements will be used.

What I claim as new and desire to secure by Letters Patent of the United States, is,—

1. In combination, a motor, a reversing controller, a relay for controlling the circuit of said motor, actuating coils on said relay, connections between controller and said coils arranged to change the relative polarities of said coils in the forward and reverse positions of the controller, a switch in the circuit containing one of said coils, and means controlled by said motor for operating said switch.

2. In combination, a motor, a reversing controller, a relay for controlling the circuit of said motor, two actuating coils on said relay, connections between said actuating coils and said controller arranged to cause said coils to operate cumulatively in the forward running position of the controller and to oppose each other in the reverse position of the controller, a switch in the circuit including one of said coils, and a device geared to the motor for controlling said switch.

3. In combination, a motor, a member geared to said motor and adapted to be moved thereby between predetermined limits, a relay for controlling the circuit of said motor and having two positions, means controlled by said controller and said member when said member is in one of its extreme positions for causing said relay to assume one of its said positions when the controller is in one running position and the other of its said positions when the controller is in the opposite running position.

4. In combination, a motor, a member geared to said motor and adapted to be moved within predetermined limits, a reversing controller, a relay for controlling the circuit of said motor, means controlled by said controller and said member for causing said relay to operate to complete the motor circuit when the controller is in one of its running positions and the said member is in its extreme position corresponding to the reverse position of the controller and for causing said relay to operate to open the motor circuit when the said member has moved to its other extreme position.

5. In combination, a motor, a reversing controller, a relay for controlling the circuit of said motor, two actuating coils on said relay, connections between said actuating coils and said controller arranged to cause said coils to act cumulatively in one position of the controller and to oppose each other in the reverse position of the controller, a normally open switch in the circuit containing one of said coils, and member operated by said motor for closing said switch.

6. In combination, a motor, a reversing controller, a relay for controlling the circuit of said motor, a maintaining coil and two auxiliary coils on said relay, connections between said coils and said controller arranged to maintain said auxiliary coils at opposite polarities and to reverse the polarities of said auxiliary coils upon reversal of the controller, switches in the circuits containing said auxiliary coils, and means controlled by said motor for operating said switches.

7. In combination, a motor, a reversing controller, a relay for controlling the circuit of said motor, a maintaining coil and a pair of auxiliary coils on said relay, connections between said coils and said controller arranged to maintain said auxiliary coils at opposite polarities and to reverse the polarities of said auxiliary coils upon reversal of the controller, a member adapted to be operated by said motor between defined limits, a switch in the circuit containing one of said auxiliary coils arranged to be operated by said member in one of its extreme positions, and a second switch in the circuit of the other auxiliary coil arranged to be operated by said member when in its other extreme position.

In witness whereof, I have hereunto set my hand this 15th day of December, 1905.

SAM H. KANMACHER.

Witnesses:
BENJAMIN B. HULL,
HELEN ORFORD.